Figure 1:
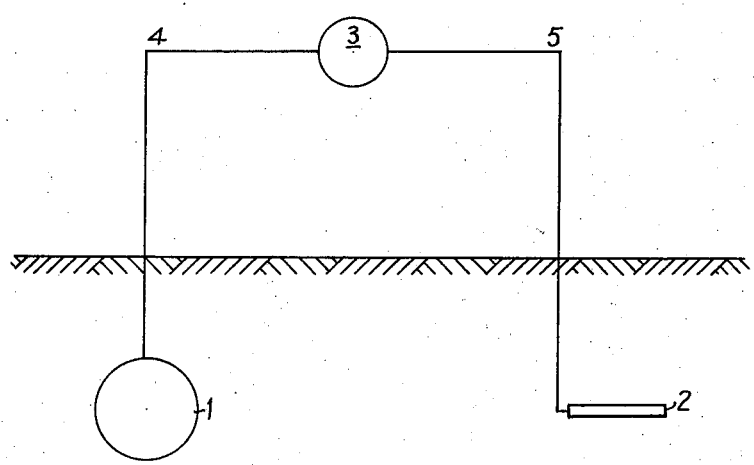

June 29, 1965    B. M. L. HEUZE    3,192,144
REFERENCE ELECTRODES FOR USE IN CATHODIC PROTECTION SYSTEMS
Filed June 4, 1964

*Inventor*

BERNARD M. L. HEUZE

By Holcombe, Wetherill & Brisebois
*Attorneys*

United States Patent Office 3,192,144
Patented June 29, 1965

3,192,144
REFERENCE ELECTRODES FOR USE IN
CATHODIC PROTECTION SYSTEMS
Bernard Marie Louis Heuze, Paris, France, assignor to
Societe d'Etudes Contre la Corrosion (S.E.C.C.O.),
Paris, France, a corporation of France
Filed June 4, 1964, Ser. No. 372,555
Claims priority, application France, Apr. 8, 1960,
824,099
11 Claims. (Cl. 204—195)

This application is a continuation-in-part application of my application Serial Number 99,577 filed March 30, 1961 and now abandoned.

The present invention relates to constant-potential electrodes for use in cathodic protection systems.

It is known to protect by means of cathodic protection a metal structure partly or wholly enclosed in a medium, such as the ground, and to this end, it is necessary to measure the difference in potential between the structure and an impolarisable electrode placed in a medium which has a certain electrical continuity with said medium which partly or wholly encloses the structure.

An object of this invention is to provide an electrode which will enable the potential of metal structures to be evaluated with respect thereto when the electrode is in a fixed position.

Another object of this invention is to provide an electrode giving a stable reference potential with respect to which a voltmeter or other device may evaluate the potential of the metal structure.

Another object of this invention is to provide an electrode giving a stable reference potential substantially unaffected by seasonal variations in humidity.

Another object of this invention is to provide an electrode which is adapted to remain in its position of use for a relatively long period of time.

Another object of this invention is to provide an electrode which is wholly in the solid state, and which does not need to be provided with an enclosing envelope or container.

Numerous electrodes, electrode compositions, and reference cells are known in the art, but these are generally quite unsuited for achieving the objects of the present invention. Any apparatus with a liquid or pasty component, e.g. a liquid or pasty electrolyte, is clearly unsuited for the purposes of the present invention, since a container for the liquid or pasty component is an essential part of said apparatus, and the container hinders the contact of the active part or parts of the apparatus with the medium enclosing said structure to be protected.

The electrode of the present invention essentially comprises a copper core embedded in a solid electrolytic mixture, and according to the invention said mixture comprises powdered copper sulphate in the proportion by volume of 30 to 70%, and clay in the proportion of 70 to 30% by volume.

Bentonite may advantageously be used as the clay.

It is in some cases advantageous to add plaster to said mixture.

It has been found that the quantity of copper sulphate which is used is an essential factor in determining the useful working life which the electrode of the present invention will have when buried in a medium such as the ground. The lower limit of copper sulphate above stated is the minimum quantity consistent with the required electrode activity and a useful working life, and the electrode life is lengthened as the quantity of copper sulphate is increased. However, increasing the amount of copper sulphate over the upper limit above stated gives a mixture which does not have convenient physical properties, i.e. the mixture crumbles too easily and does not stay in place on the copper core. It is preferred to use a mixture containing 50% of copper sulphate and 50% of clay or bentonite, both by volume.

In accordance with the invention, it is preferred to construct the copper core to have a series of consecutive pockets in its surface along its length to facilitate the embedding of the core in said solid electrolytic mixture.

In order that the invention may be more clearly understood, reference will now be made to the accompanying drawing, which show one embodiment of a constant-potential electrode constructed in accordance with the invention, and which also illustrate an example of the use of the electrode.

Figure 2:
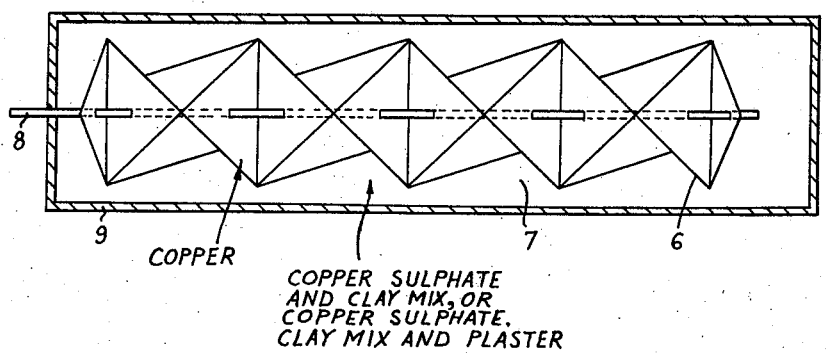

In the drawing:

FIGURE 1 is a schematic circuit diagram showing an electrode in accordance with the invention in use, and FIGURE 2 is an embodiment of the electrode itself.

Referring now to FIGURE 1, there is diagrammatically shown a metallic structure 1 buried for example in soil indicated by the hatched line. The reference electrode is shown at 2, which is also buried in the soil at a fixed point. The drawing also shows how the potential between structure 1 and the electrode 2 may be measured by a voltmeter 3 connected to parts 1 and 2 by conductors 4 and 5, respectively, as shown.

The constant-potential electrode shown in FIGURE 2 comprises a copper core element 6 embedded in a solid electrolytic mixture 7, and having an output lead 8 which may be connected to the voltmeter 3 of FIGURE 1 by means of conductor 5 (FIGURE 1).

In order to give the copper core element 6 a very large surface area, it is formed of two ribbons of copper foil respectively oriented at 90° and alternately folded one over the other in such a way as to constitute a series of consecutive pockets along the length of the copper core element 6.

The solid electrolytic mixture 7 consists of 30 to 70% by volume of powdered copper sulphate and 70 to 30% by volume of clay. The clay retains moisture and keeps the potential of the electrode substantially constant when it is used. Bentonite may advantageously be used as the clay.

The preferred composition of the solid electrolytic mixture is 50% by volume of clay (e.g. bentonite) and 50% by volume of powdered copper sulphate. It is found in practice that only a small proportion of copper sulphate is required to make the electrode active, but if the solid electrolytic mixture 7 contains too low an amount of copper sulphate, the life of the electrode is too short. The electrode of the present invention is intended to remain buried in soil or some other medium for a considerable time, and it is found that the preferred proportion of copper sulphate indicated above will meet most general requirements.

It is found convenient in practice to add wet plaster to the solid electrolytic mixture 7. When the plaster has hardened, the resulting solid block is in a particularly convenient form for insertion into a hole in the ground. The following figures indicate typical ranges of proportions by volume of the constituents of the solid electrolytic mixture 7 if plaster is included:

| | Percent |
|---|---|
| Powdered copper sulphate | 25 |
| Bentonite | 25 |
| Wet mixed plaster | 50 |

If desired a porous envelope 9 may surround the electrode, but alternatively the reference electrode may be made for example by disposing the element 6 and the electrolytic mixture 7 together in a hole made in the ground and afterwards filled in.

In order to maintain humidity the electrolytic mixture can be covered with clay with or without an envelope.

By reason of the constitution of the electrode 2, the reference potential which it provides is constant in spite of the current consumption of the voltmeter 3 itself and in spite of the seasonal variation in the humidity of the earth.

If desired the voltmeter 3 may be replaced by a relay controlling the action of an automatic regulation device for ensuring cathodic protection.

I claim:

1. A constant-potential reference electrode for use in cathodic protection systems, comprising a copper core embedded in a solid electrolytic mixture, said mixture consisting of 30 to 70% by volume of powdered copper sulphate and 70 to 30% by volume of clay.

2. A constant-potential reference electrode for use in cathodic protection systems, comprising a copper core embedded in a solid electrolytic mixture, said mixture consisting of 50% by volume of powdered copper sulphate and 50% by volume of clay.

3. A constant-potential reference electrode for use in cathodic protection systems, comprising a copper core embedded in a solid electrolytic mixture, said mixture consisting of 30 to 70% by volume powdered copper sulphate and 70 to 30% by volume bentonite.

4. A constant-potential reference electrode for use in cathodic protection systems, comprising a copper core embedded in a solid electrolytic mixture, said mixture consisting of 50% by volume powdered copper sulphate and 50% by volume bentonite.

5. A constant-potential reference electrode for use in cathodic protection systems, comprising a copper core embedded in a solid electrolytic mixture, said mixture consisting of 25% by volume of powdered copper sulphate, 25% by volume of clay, and 50% by volume of plaster.

6. A constant-potential reference electrode for use in cathodic protection systems, comprising a core of copper, a series of consecutive pockets in the surface of said core of copper and along its length, said core being embedded in a mixture consisting of 30 to 70% by volume of powdered copper sulphate and 70 to 30% by volume of clay.

7. A constant-potential reference electrode according to claim 6, wherein said clay is bentonite.

8. A constant-potential reference electrode for use in cathodic protection systems, comprising a core of copper, a series of consecutive pockets in the surface of said core of copper and along its length, said core being embedded in a mixture consisting of 25% by volume of powdered copper sulphate, 25% by volume of clay, and 50% by volume of plaster.

9. A constant-potential reference electrode for use in cathodic protection systems, comprising a copper core formed of two ribbons of copper foil respectively oriented at 90° and alternately folded one over the other to constitute a series of pockets consecutively along the length of said copper core, said core being embedded in a mixture consisting of 30 to 70% by volume of powdered copper sulphate and 70 to 30% by volume of clay.

10. A constant-potential reference electrode according to claim 9, wherein said clay is bentonite.

11. A constant-potential reference electrode for use in cathodic protection systems, comprising a copper core formed of two ribbons of copper foil respectively oriented at 90° and alternately folded one over the other to constitute a series of pockets consecutively along the length of said copper core, said core being embedded in a mixture consisting of 25% by volume of powdered copper sulphate, 25% by volume of clay, and 50% by volume of plaster.

No references cited.

WINSTON A. DOUGLAS, *Primary Examiner.*